United States Patent
Lee et al.

(10) Patent No.: US 10,523,071 B2
(45) Date of Patent: Dec. 31, 2019

(54) MAGNETIC MOTOR WITH STATOR AND ROTOR

(71) Applicant: Samsung Electronics Co., Ltd., Suwon-si (KR)

(72) Inventors: Sung Gu Lee, Anyang-si (KR); Su Kwon Jeong, Suwon-si (KR); Jae Woong Jung, Seoul (KR); Woong Hwang, Suwon-si (KR); Uk Ho Seo, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 351 days.

(21) Appl. No.: 15/323,867

(22) PCT Filed: Jul. 4, 2014

(86) PCT No.: PCT/KR2014/006034
§ 371 (c)(1),
(2) Date: Jan. 4, 2017

(87) PCT Pub. No.: WO2016/002994
PCT Pub. Date: Jan. 7, 2016

(65) Prior Publication Data
US 2017/0133895 A1 May 11, 2017

(51) Int. Cl.
*H02K 1/27* (2006.01)
*H02K 1/14* (2006.01)
(Continued)

(52) U.S. Cl.
CPC .......... *H02K 1/2706* (2013.01); *H02K 1/146* (2013.01); *H02K 1/24* (2013.01); *H02K 1/2773* (2013.01); *H02K 1/2786* (2013.01); *H02K 21/16* (2013.01)

(58) Field of Classification Search
CPC ........ H02K 1/2706; H02K 1/146; H02K 1/24; H02K 1/2773; H02K 1/2786; H02K 21/16
See application file for complete search history.

(56) References Cited

U.S. PATENT DOCUMENTS

| 6,353,275 B1 | 3/2002 | Nishiyama et al. |
| 2005/0001503 A1* | 1/2005 | Hans ............... H02K 1/2766 310/156.53 |

(Continued)

FOREIGN PATENT DOCUMENTS

| CN | 1788401 | 6/2006 |
| CN | 100514794 | 7/2009 |

(Continued)

OTHER PUBLICATIONS

International Search Report dated Mar. 31, 2015 in corresponding International Application No. PCT/KR2014/006034.

(Continued)

*Primary Examiner* — Emily P Pham
(74) *Attorney, Agent, or Firm* — Staas & Halsey LLP (57) ABSTRACT

Disclosed is a motor comprising a stator and a rotor, wherein the rotor comprises a plurality of rotor cores and a plurality of magnets, and wherein the magnet is configured to have a face facing the center of rotation of the rotor exposed. Accordingly, a motor may minimize a non-magnetization area and enable a magnet to be fully magnetized, when it comes to post magnetization of the magnet.

18 Claims, 8 Drawing Sheets

(51) Int. Cl.
*H02K 1/24* (2006.01)
*H02K 21/16* (2006.01)

(56) References Cited

U.S. PATENT DOCUMENTS

| | | | | |
|---|---|---|---|---|
| 2006/0061228 A1* | 3/2006 | Lee | ............... | H02K 1/2773 310/156.57 |
| 2007/0252469 A1* | 11/2007 | Nishiura | ............... | H02K 1/2773 310/156.56 |
| 2009/0096308 A1* | 4/2009 | Staudenmann | ...... | H02K 1/2773 310/156.08 |
| 2011/0127859 A1 | 6/2011 | Amrhein et al. | | |
| 2012/0038237 A1* | 2/2012 | Li | ............... | H02K 1/146 310/156.45 |
| 2012/0112591 A1 | 5/2012 | Feuerrohr et al. | | |
| 2013/0057103 A1* | 3/2013 | Han | ............... | H02K 1/2773 310/156.12 |
| 2013/0061641 A1 | 3/2013 | Yoon et al. | | |
| 2013/0187486 A1* | 7/2013 | Lee | ............... | H02K 5/02 310/43 |
| 2013/0187506 A1* | 7/2013 | Lee | ............... | H02K 1/278 310/156.12 |
| 2014/0042857 A1 | 2/2014 | Mader et al. | | |
| 2014/0102674 A1* | 4/2014 | Manz | ............... | H02K 1/2773 165/121 |
| 2014/0103768 A1* | 4/2014 | Brahmavar | ............... | H02K 21/16 310/156.08 |
| 2014/0306569 A1* | 10/2014 | Kojima | ............... | H02K 1/28 310/156.21 |
| 2014/0354103 A1* | 12/2014 | Kang | ............... | H02K 21/16 310/156.08 |
| 2015/0022042 A1* | 1/2015 | Han | ............... | H02K 1/2773 310/156.57 |
| 2015/0295460 A1* | 10/2015 | Ekin | ............... | H02K 1/28 310/156.21 |
| 2015/0318747 A1* | 11/2015 | Kamiyoshihara | ........ | H02K 5/02 310/43 |

FOREIGN PATENT DOCUMENTS

| | | |
|---|---|---|
| CN | 102449881 A | 5/2012 |
| CN | 103001358 A | 3/2013 |
| CN | 103580423 A | 2/2014 |
| CN | 103779995 A | 5/2014 |
| EP | 1223658 A1 | 7/2002 |
| EP | 20403109 | 1/2012 |
| EP | 2568579 | 3/2013 |
| JP | 2006-20406 | 1/2006 |
| KR | 10-2005-0069935 | 7/2005 |
| KR | 10-2006-0025729 | 3/2006 |
| KR | 20-2009-0007370 | 7/2009 |
| KR | 10-2010-0084939 | 7/2010 |
| KR | 20-0462692 | 9/2012 |
| KR | 10-2013-0025141 | 3/2013 |
| KR | 10-2013-0027417 | 3/2013 |
| KR | 10-2013-0027673 | 3/2013 |

OTHER PUBLICATIONS

Korean Office Action dated Apr. 4, 2018 in Korean Patent Application No. 10-2016-7036650.
Chinese Office Action dated Jul. 20, 2018 in Chinese Patent Application No. 201480081745.3.
Korean Office Action dated Aug. 2, 2018 in Korean Patent Application No. 10-2016-7036650.
Korean Office Action (Notice of Patent Allowance) dated Feb. 7, 2019 and issued in corresponding Korean Patent Application No. 9-5-2019-008867342 (3 Total pages).
Chinese Patent Second Office Action issued in Chinese Patent Application No. 201480081745.3 dated Mar. 13, 2019 (18 Total pages).
Chinese Office Action dated Aug. 15, 2019 in related Chinese Patent Application No. 201480081745.3 X.

\* cited by examiner

MAGNETIC MOTOR WITH STATOR AND ROTOR

CROSS-REFERENCE TO RELATED APPLICATION

This application is a U.S. national stage application, which claims the benefit under 35 USC § 371 of PCT International Patent Application No. PCT/KR2014/006034 filed Jul. 4, 2014, the entire contents of which are incorporated herein by reference.

TECHNICAL FIELD

The present disclosure relates to motors, and more particularly, to a motor with enhanced structure for improved performance.

BACKGROUND ART

In general, a flux concentrating motor consists of a stator to increase torque production per volume by flux concentration, and a rotor arranged inside or outside of the stator to be rotated by electromagnetically interacting with the stator, the rotor including a rotor cores divided and arranged in the circumferential direction of the rotor and a permanent magnet (hereinafter, called a 'magnet') combined between the rotor cores.

For the method for combining the magnet with the rotor cores, there are a method for magnetizing the magnet and combining the magnetized magnet between the rotor cores (hereinafter, called a pre-magnetizing method) and a method for combining a non-magnetized magnet between the rotor cores and then magnetizing the magnet (hereinafter, called a 'post magnetizing method). As for the pre-magnetizing method, while it is easy to magnetize the magnet, combining is not easy because of attraction force or repulsive force between magnets, which might cause damage to peripheral equipments. Accordingly, the post magnetizing method is usually used these days.

DISCLOSURE

Technical Problem

As for the post magnetizing method, combining of a magnet is easy but the problem arises due to a difference in magnetization efficiency of a magnet depending on problem arises due to a difference in magnetization efficiency of a magnet depending on the structure in which the magnet is arranged on the rotor.

Technical Solution

In accordance with one aspect of the present invention, a motor includes a stator having a plurality of stator cores arranged in a circumferential direction and coils wound around the plurality of stator cores; and a rotor arranged to be able to rotate inside or outside of the stator. The rotor comprises a plurality of rotor cores arranged in a circumferential direction of the rotor; and a plurality of magnets arranged between the plurality of rotor cores. The magnet is configured to have a face facing the center of rotation of the rotor exposed.

The magnet includes a first face, a second face, an opposite face of the first face, placed farther away from the center of the rotor than the first face is, and a third face placed between the first and second faces. The second and third faces are configured to be supported by the rotor core. The first face is configured to be exposed to the center of rotation of the rotor.

The first face is configured to have the entire gamut exposed to the center of rotation of the rotor.

The rotor includes a plurality of magnet receivers formed between the plurality of rotor cores for receiving the plurality of magnets. The magnet receivers includes combining space in which the plurality of magnets are arranged; and open space formed by being extended from the combining space to the center of the rotor.

The magnet is arranged to have at least a part exposed to the open space.

The magnet is configured to be fixed in the rotor core by having the second and third faces supported by the rotor core.

The rotor core includes a rotor core body having a magnet contact face to come into contact with the third face; and a core projection formed to protrude from the rotor core body to the circumferential direction in order to support at least a part of the second face.

The rotor core body includes a magnet contact face tightly contacting the third face of the magnet; and an adhesive hole concavely formed from the magnet contact face in order for an adhesive to be injected thereto.

The rotor core body is configured to become thicker in the circumferential direction as it gets away from the center of the rotor. The magnet contact face is configured to be in parallel with a magnet contact face of a neighboring rotor core.

The rotor includes a core connector configured to support the rotor core and extend from the rotor core to the circumferential direction. The core connector is configured to be thinner than a neighboring rotor core.

The rotor includes a rotor shaft formed in the direction of a rotor axis; and a ring combiner combined with the rotor shaft to enclose the rotor shaft. The core connector is configured to connect at least a part of the ring combiner in the direction of the rotor axis to at least a part of the rotor core in the direction of the rotor axis.

The core connector includes a first core connector configured to connect the top of the rotor core to the top of the ring combiner, with respect to the height direction of the rotor; and a second core connector configured to connect the bottom of the rotor core to the bottom of the ring combiner.

The magnet is configured to protrude more than the plurality of rotor cores in the direction of a rotor axis of the rotor.

The rotor includes a supporting bridge formed to extend from one of the plurality of the rotor cores to another rotor core.

The rotor core includes a magnet contact face formed to face the circumferential direction of the rotor. The magnet is configured to have the second face supported by the supporting bridge, and have the third face come into contact with the magnet contact face.

The supporting bridge is configured to support at least a part of the second face.

The supporting bridge includes a pair of supporting bridges arranged in the rotor core at one end and the other end in the direction of the rotor axis.

The rotor includes a rotor shaft formed in the direction of a rotor axis; and a ring combiner combined with the rotor shaft to enclose the rotor shaft. The rotor core is configured to separated from the ring combiner.

The rotor includes insulation connectors configured to connect the ring combiner to the plurality of rotor cores and include a plastic material.

The insulation connectors are injection-molded with the rotor cores and the ring combiner.

In accordance with one aspect of the present invention, a motor includes a stator; and a rotor having a rotor axis and electromagnetically interacting with the stator to be rotated. The rotor includes a plurality of magnets arranged in a circumferential direction of the rotor; and a plurality of rotor cores forming magnet receivers, in which the plurality of magnets are arranged, and arranged in the circumferential direction of the rotor for each of the plurality of magnets to be arranged between the neighboring rotor cores. The magnet receivers includes combining space in which the plurality of magnets are combined; and open space formed by being extended from the combining space to the center of the rotor.

The magnet includes a first face, a second face, an opposite face of the first face, placed farther away from the center of the rotor than the first face is, and a third face placed between the first and second faces. The magnet is configured to be fixed in the rotor core by having the second and third faces supported by the rotor core.

The first face is configured to have the entire gamut exposed to the open space.

In accordance with one aspect of the present invention, a motor includes a stator; and a rotor arranged to be able to concentrically rotate with the stator by electromagnetically interacting with the stator. The rotor includes a plurality of magnets arranged in a circumferential direction of the rotor; and a rotor body having magnet receivers formed in the circumferential direction of the rotor for receiving the plurality of magnets. The plurality of magnets includes a first face, a second face, an opposite face of the first face, placed farther away from the center of the rotor than the first face is, and a third face placed between the first and second faces. The first face is arranged not to be supported by the rotor body.

The rotor includes a plurality of magnet receivers formed between the plurality of rotor cores for receiving the plurality of magnets. The magnet receivers includes combining space in which the plurality of magnets are arranged; and open space formed by being extended from the combining space to the center of the rotor.

The motor further includes a molding placed in the open space and formed of a non-magnetic material.

Advantageous Effects

A motor according to the present disclosure may minimize a non-magnetization area and enable a magnet to be fully magnetized, when it comes to post magnetization of the magnet.

BEST MODE

Reference will now be made in detail to embodiments, examples of which are illustrated in the accompanying drawings, wherein like reference numerals refer to the like elements throughout.

Figure 1:
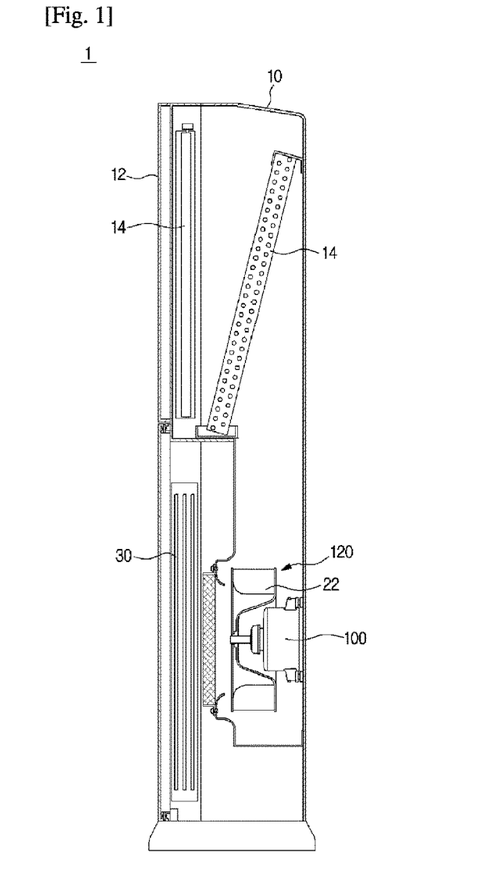
FIG. 1 shows an indoor unit of an air conditioner (AC), according to a first embodiment of the present disclosure.

FIG. 1 shows an indoor unit of an air conditioner (AC), according to a first embodiment of the present disclosure.

As shown in FIG. 1, an indoor heat exchanger 14 and a blower 20 are installed inside a main body 10 of an AC 1, and a sucking grill 30 for sucking in outside air and a discharging grill 40 for discharging heat-exchanged air are installed on the side of the main body 10 of the AC 1. The discharging grill 40 is supposed to be opened while the AC 1 is operated. The front of the main body 10 of the AC 1 is opened for cleaning, repair or replacement of a part, etc. A front panel 12 is pivotally installed on the front of the main body 10 of the AC 1, hingedly opening or closing an opening of the main body 10 of the AC 1.

The blower 20 includes a blower fan 22 and a motor 100.

The blower fan 22 is arranged for incoming air through the sucking grill 30 to move to the discharging grill 40 and arranged to receive turning force from the motor 100.

Figure 2A:
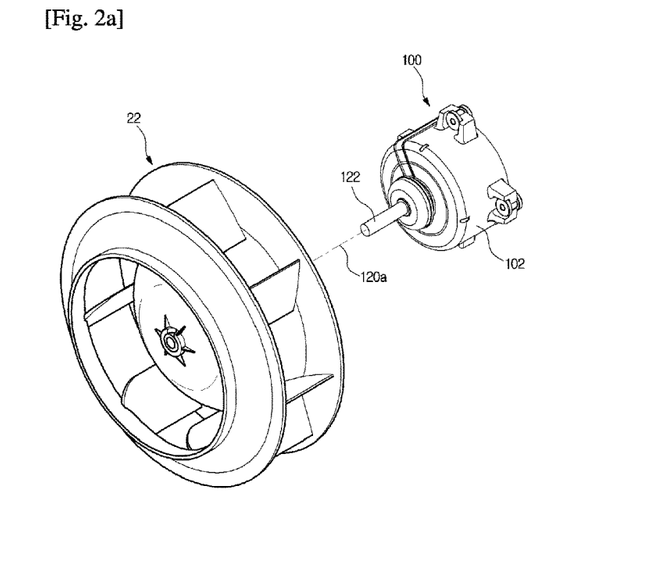
FIG. 2A is an exploded view of a blower, according to the first embodiment of the present disclosure.
Figure 2B:
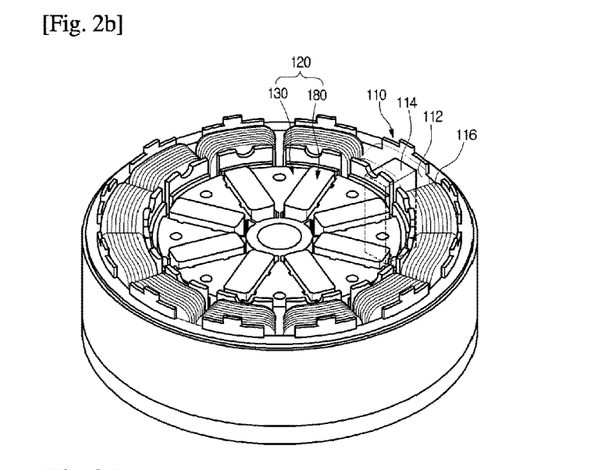
FIG. 2B is a perspective view of a motor, according to the first embodiment of the present disclosure.

FIG. 2A is an exploded view of a blower, according to the first embodiment of the present disclosure. FIG. 2B is a perspective view of a motor, according to the first embodiment of the present disclosure.

The motor 100 generates turning force to rotate the blower fan 22. Outside the motor 100, there may be a motor body 102 forming the exterior.

The motor 100 includes a stator 110 and a rotor 120.

The stator 110 is configured to include a ring-type stator body 112 forming the outer fence, a plurality of stator cores 114 radially protruding from the inner circumferential face of the ring-type stator body 112 in the direction to the center of the rotor 120, and coils 116 wound around the stator cores 114 and connected to an external power source. Although an inner-type motor 100 with the rotor 120 arranged inside of the stator 110 is described in embodiments of the present disclosure, an outer-type motor 100 with the rotor 120 arranged outside of the stator 110 may be applied.

Figure 3A:
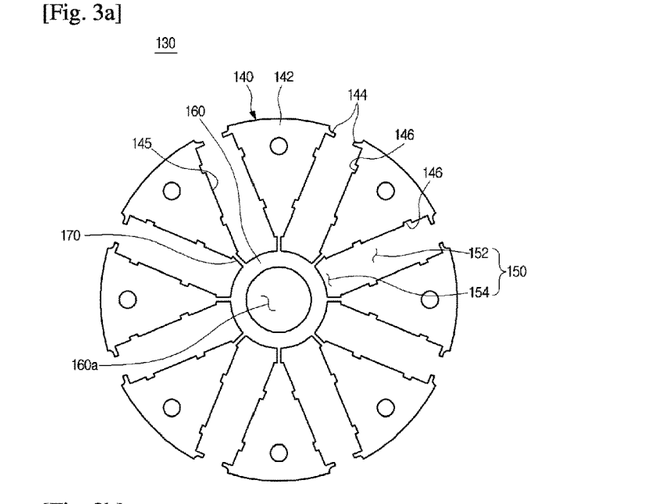
FIG. 3A is a front view of a rotor body, according to the first embodiment of the present disclosure.
Figure 3B:
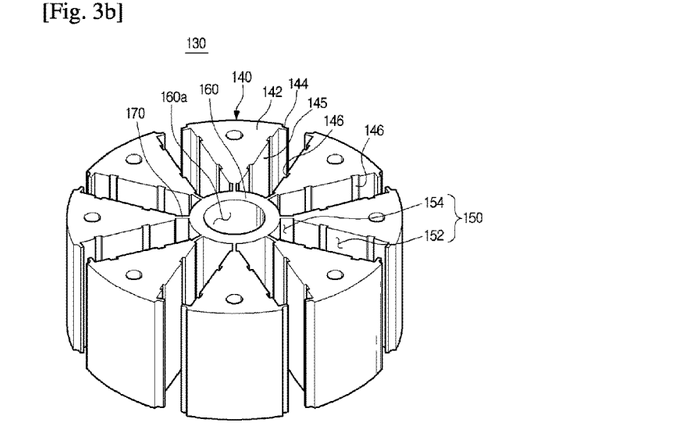
FIG. 3B is a perspective view of the rotor body, according to the first embodiment of the present disclosure.
Figure 4:
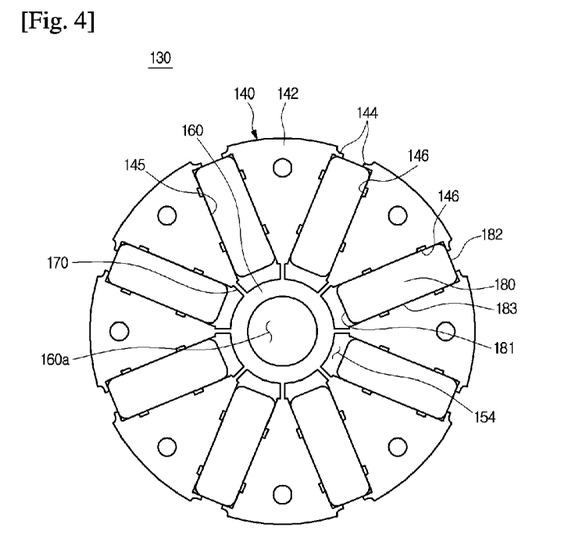
FIG. 4 is a front view of the rotor, according to the first embodiment of the present disclosure.
Figure 5:
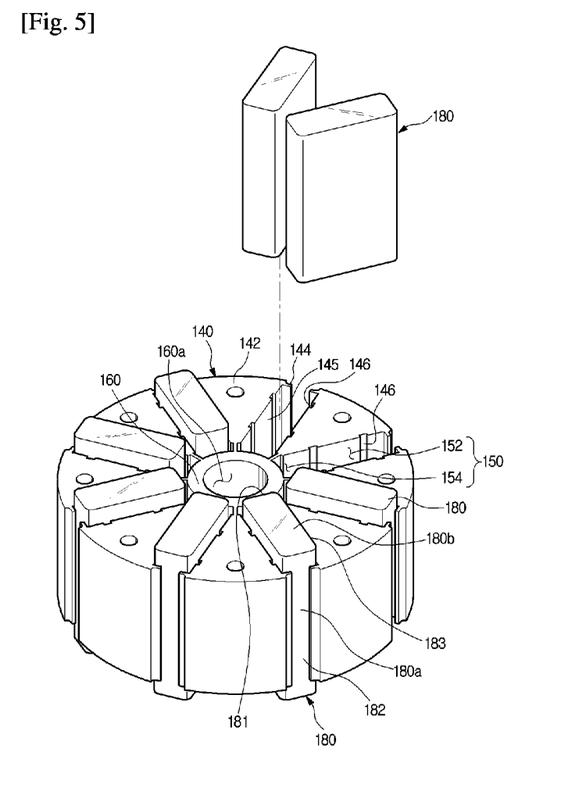
FIG. 5 is a perspective view of the rotor, according to the first embodiment of the present disclosure.

FIG. 3A is a front view of a rotor body, according to the first embodiment of the present disclosure, FIG. 3B is a perspective view of the rotor body, according to the first embodiment of the present disclosure, FIG. 4 is a front view of the rotor, according to the first embodiment of the present disclosure, FIG. 5 is a perspective view of the rotor, according to the first embodiment of the present disclosure.

The rotor 120 is arranged to be able to rotate by electromagnetically interacting with the stator 110.

The rotor 120 includes a rotor body 130 and magnets 180.

The rotor body 130 includes a plurality of rotor cores 140 radially arranged from the center of the rotor 120. Although not shown for the purpose of convenience, the rotor body 130 may be formed by stacking boards formed by press working on silicon steel plates.

There may be a plurality of rotor cores 140 arranged with gaps along the circumferential direction. In other words, the plurality of rotor cores 140 may be radially arranged and separated in the circumferential direction of the rotor 120 at regular intervals.

There are no limitations on the shape of the rotor core 140, but in the embodiment of the present disclosure, the rotor 120 is formed to be widened along the radial direction of the rotor 120. The rotor core 140 may be formed to have a cross section in a roughly triangular shape.

The rotor body 130 may include magnet receivers 150. Each magnet receiver 150 is arranged between rotor cores 140, allowing each of the plurality of magnets 180 to be arranged therein. The magnet receivers 150 may be formed to have a corresponding width to that of the magnet 180, for the magnet 180 to be received safely.

The magnet receivers 150 include combining space 152 to be combined with the plurality of magnets 180, and open space 154 formed by being extended from the combining space toward the center of the rotor 120.

The combining space 152 may be formed to have a width corresponding to the width of the magnet 180 for the magnet 180 to be safely received therein, and the open space 154 may be formed to have a narrower width than the width of the combining space 154 because the open space 154 is arranged to be closer to the center of the rotor 120 than the combining space 152 is.

As the open space 154 is formed along with the combining space 152 to be combined with the magnet 180, a part of the magnet 180 toward the center of the rotor 120 may be exposed to the open space 154.

The protruding structure from the rotor core 140 to the circumferential direction of the rotor 120 may increase leakage flux, thereby degrading performance of the motor 100. In the embodiment of the present disclosure, by minimizing the protruding structure from the rotor core 140 to the circumferential direction of the rotor 120 and having the face of the magnet 180 toward the center of the rotor 120 exposed to the open space 154, the entire gamut of the magnet 180 may be magnetized in the so-called post magnetization work, by which the magnet 180 is magnetized after being combined with the rotor 120.

The plurality of magnets 180 are inserted to the magnet receivers 150 arranged in the rotor body 130, and then radially moved by a rotating jig (not shown) and combined in the combining space 152.

The open space 154 may be formed to be empty as shown in the drawing, or may be filled with a molding (not shown) formed of a non-magnetic material. Since the molding may fill the open space 154, it is not seen. The molding may firmly support the magnet 180 and the rotor body 130 by connecting the magnet 180 and the rotor body 130. The molding may be injection-molded with the rotor 120. Since the molding is formed of a non-magnetic material, it may not affect the efficiency of magnetization of the magnet 180.

The rotor core 140 includes a rotor core body 142 and a core projection 144.

The rotor core body 142 constitutes the body of the rotor core 140, and has magnet contact faces 145 on either sides in the circumferential direction of the rotor 120 to come into contact with the magnet 180. The rotor core body 142 may be formed to be thick in the circumferential direction as it is away from the center of the rotor 120. The rotor core body 142 may have a roughly triangular form.

There are no limitations on where to form the pair of magnet contact faces 145 on the rotor core body 142, but the pair of magnet contact faces 145 may be separated to form a certain angle between them. The magnet contact face 145 of one of the plurality of rotor cores 140 may be arranged in parallel with that of another neighboring rotor core 140.

The core projection 144 will be described later.

Magnets 180 may each be arranged between the rotor cores 140. In other words, the plurality of rotor cores 140 and the plurality of magnets 180 may be alternately arranged along the circumferential direction of the rotor 120. The magnet 180 may include ferrite or a rare-earth element to maintain a magnetic property in a semi-permanently high energy density.

The plurality of non-magnetized magnets 180 are each arranged between neighboring rotor cores 140 and then alternately magnetized in a circumferential direction of the rotor 120 or in the opposite direction.

The magnets 180 alternately magnetized in a circumferential direction or in the opposite direction form a structure in which identical polarities are arranged to face each other, thereby having flux concentrated and reducing leakage flux.

There are no limitations on the shape of the magnet 180, but in the embodiment of the present disclosure, the magnets 180 have a rectangular cross section to be placed longways in the radial direction of the rotor 120.

The magnet 180 may include a first face 181 toward the center of the rotor 120, a second face 182 opposite of the first face 181, arranged farther away from the center of the rotor 120 than the first face 181 is, and a third face 183 formed between the first and second faces 181 and 182.

The second and third faces 182 and 183 may be supported by the rotor core 140. Specifically, the second face 182 is supported by the core projection 144, which will be described later, and the third face 183 is supported by the magnet contact face 145 of the rotor core body 142. The first face 181 may be formed to be opened toward the center of the rotor 120. In other words, the first face 181 may be formed to be exposed to the open space 154.

The second face 182 is safely received in the core projection 144, and the third face 183 is fixed by coming into contact with the magnet contact face 145. In this procedure, the first face 181 of the magnet 180 is formed to be exposed to the open space 154. Specifically, the entire gamut of the first face 181 of the magnet 180 is formed to be exposed to the open space 154.

The magnet 180 may be formed to protrude more than the plurality of rotor cores 140 along the direction of the rotor axis 120a. That is, the magnet 180 may be formed to be higher than the rotor core 140. This configuration may increase flux without extending the length of the direction of the rotor axis 120a of the rotor core 140, thereby improving performance of the motor 100. The magnet 180 may include a first magnet 180a supported by the rotor core 140, and a second magnet 180b integrally formed with the first magnet 180a and protruding outwards from the rotor core 140.

The rotor body 130 includes a ring combiner 160 and core connectors 170.

The rotor 120 includes a rotor shaft 122 formed to axially rotate around the rotor axis 120a. The rotor shaft 122 may be rotated by turning force generated by electromagnetic interaction between the rotor 120 and the stator 110. The ring combiner 160 is combined with the rotor shaft 122 while enclosing the rotor shaft 122. The rotor shaft 122 and the ring combiner 160 may be integrally formed, and the ring combiner 160, which is an element of the rotor body 130, may be detached from the rotor shaft 122. The ring combiner 160 is rotated along with rotation of the rotor shaft 122. A cavity 160a is formed in the middle of the ring combiner 160 for the rotor shaft 122 to pass through.

The core connector 170 is formed to connect the ring combiner 160 with the plurality of rotor cores 140. The core connector 170 may radially extend from the ring combiner 160 and connect the plurality of rotor cores 140 and the ring combiner 160 to integrally form them. The core connector 170 is formed to be thinner than the rotor cores 140 so as to reduce leakage flux.

Figure 6:
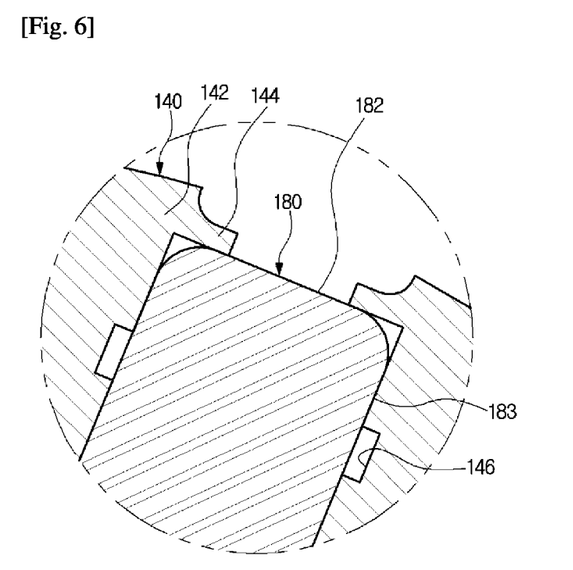
FIG. 6 is an enlarged view of a part of the rotor, according the first embodiment of the present disclosure.

FIG. 6 is an enlarged view of a part of the rotor, according to the first embodiment of the present disclosure.

The rotor core 140 includes a core projection 144 and adhesive holes 146.

The core projection 144 is formed to protrude from the rotor core body 142 in the circumferential direction. The core projection 144 may be formed to support the outer side of the magnet 180. Specifically, the core projection 144 may be formed to support at least a part of the second face 182 of the magnet 180.

The core projection 144 may be formed to protrude to either side from the rotor core 140 in the circumferential direction. This configuration may enable the magnet 180 to have the second face 182 supported by a pair of core projections 144 protruding from the rotor cores 140 arranged on either sides of the magnet 180.

The rotor core body 142 may include a first section in which the core projection 144 is formed on the outer side of the rotor core body 142 to the direction of the rotor axis 120a, and a second section with no core projection 144 formed therein. In embodiments of the present disclosure, the entire section of the rotor core body 142 is formed as the first section along the direction of the rotor axis 120a, but it is not limited thereto and the rotor core body 142 may be divided into the first and second sections, the core projection 144 only formed in any of the sections of the rotor core body 142.

The adhesive holes 146 are formed for an adhesive to be injected thereto for adhesion between the magnet 180 and the rotor core 140. Specifically, the third face 183 of the magnet and the magnet contact face 145 of the rotor core 140 adhere to each other.

The adhesion hole 146 is formed in the rotor core body 142. The adhesion hole 146 may be formed in the magnet contact face 145 of the rotor core body 142 to come into close contact with the third face 183 of the magnet 180. The adhesion hole 146 may be concavely formed from the magnet contact face 145 for the adhesive to be injected thereto. With the adhesion injected into the adhesive hole 146, the rotor core 140 and the magnet 180 may come into contact with each other by the adhesive.

There are no limitations on the arrangement and shape of the adhesive hole 146, but in embodiments of the present disclosure, a plurality of adhesive holes 146 are formed in parallel with the direction of the rotor axis 120a.

Figure 7:
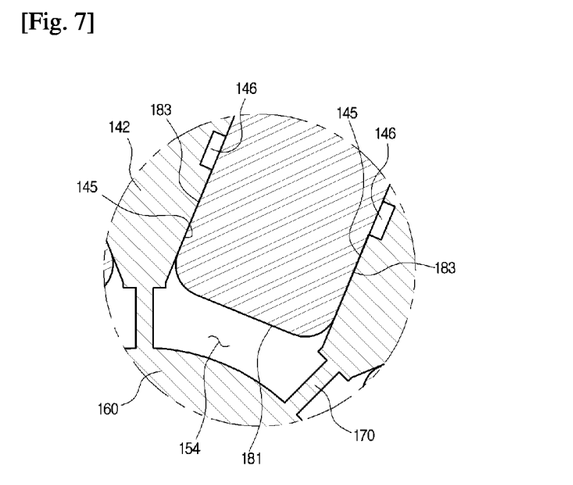
FIG. 7 is an enlarged view of a part of the rotor, according to the first embodiment of the present disclosure.
Figure 8:
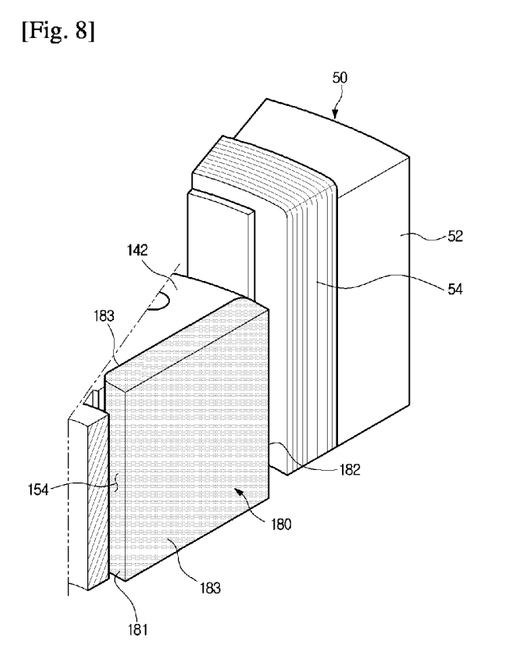
FIG. 8 shows a magnetization process of the rotor, according to the first embodiment of the present disclosure.

FIG. 7 is an enlarged view of a part of the rotor, according to the first embodiment of the present disclosure, and FIG. 8 shows a magnetization process of the rotor, according to the first embodiment of the present disclosure.

The open space 154 may be formed inside of the combining space 152, in which the magnet 180 is arranged. With the open space 154, the first face 181 of the magnet 180 is exposed to the open space 154. The open space 154 may be surrounded by the ring combiner 160, the core connector 170, and the first face 181 of the magnet 180.

As the inner side of the magnet 180, i.e., the first face 181 of the magnet 180 is not supported by the rotor body 130 but is separated from the rotor body 130, magnetization efficiency of the part on the first face 181 of the magnet 180 may be improved.

A post magnetization process of the magnet 180 having inserted to and combined with the rotor body 130 will now be described.

Referring to FIG. 8, the magnet 180 may be magnetized by activating a magnetizer 50 in the radial direction of the rotor 120 while the magnet 180 is combined with the combining space 152 among the magnet receiver 150 in the rotor body 130. The magnetizer 50 includes a magnetizing yoke 52 and a magnetizing yoke coil 54 wound around the magnetizing yoke 52.

The non-magnetized magnets 180 are each arranged in the magnet receiver 150 between the rotor cores 140, and alternately magnetized in a circumferential direction or the opposite direction. The magnets 180 alternately magnetized in a circumferential direction or in the opposite direction form a structure in which identical polarities are arranged to face each other, thereby having flux concentrated and reducing leakage flux.

In this process, since the first face 181 of the magnet 180 is opened to the open space 154 and there is nothing to support the first face 181, which is the inner side of the magnet 180, leakage flux may be minimized, thereby improving magnetization efficiency of the magnet 180.

A motor 200 in accordance with a second embodiment will now be described.

Features overlapping with the aforementioned embodiments will be omitted herein.

Figure 9A:
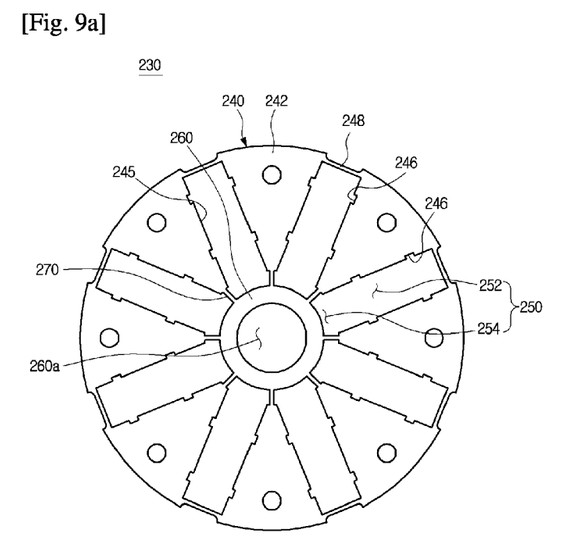
FIG. 9A is a front view of a rotor, according to a second embodiment of the present disclosure.
Figure 9B:
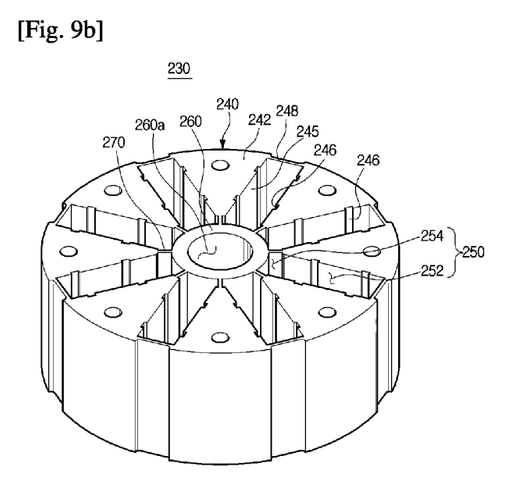
FIG. 9B is a perspective view of the rotor body, according to the second embodiment of the present disclosure.
Figure 10:
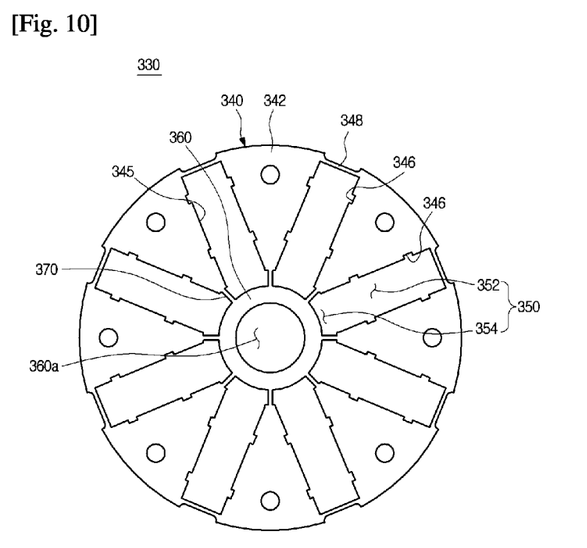
FIG. 10 is a front view of a rotor body, according to a third embodiment of the present disclosure.

FIG. 9A is a front view of a rotor, according to a second embodiment of the present disclosure, FIG. 9B is a perspective view of the rotor body, according to the second embodiment of the present disclosure, and FIG. 10 is a front view of a rotor body, according to a third embodiment of the present disclosure.

In the embodiment, a rotor body 230 is different from what is shown in the first embodiment.

The rotor body 230 includes a plurality of rotor cores 240 radially arranged from the center of a rotor 220.

The rotor core 240 includes a rotor core body 242 and a supporting bridge 248.

The rotor core body 242 constitutes the body of the rotor core 240, and has magnet contact faces 245 on either sides in the circumferential direction of the rotor 220 to come into contact with a magnet 280. The rotor core body 242 may be formed to be thick in the circumferential direction as it is away from the center of the rotor 220. The rotor core body 242 may have a roughly triangular form.

There are no limitations on where to form the pair of magnet contact faces 245 on the rotor core body 242, but the pair of magnet contact faces 245 may be separated to form a certain angle between them. The magnet contact face 245 of one of the plurality of rotor cores 240 may be arranged in parallel with that of another neighboring rotor core 240.

The supporting bridge 248 supports the magnet 280 in the radial direction, preventing the magnet 280 from deviating from the rotor body 230.

The supporting bridge 248 may be formed to support the outer side of the magnet 280. Specifically, the supporting bridge 248 may be formed to support the second face 282 of the magnet 280.

The supporting bridge 248 is formed to connect one of the plurality of rotor cores 240 to another neighboring rotor core 240. While the first embodiment has the core projection 244 formed to support the second face 282 of the magnet 280 in the direction of the rotor axis 220a, the second embodiment has the supporting bridge 248 formed to support the second face 282 of the magnet 280 in the circumferential direction of the rotor 220.

The rotor core body 242 may include a first section in which the supporting bridge 248 is formed in the direction of the rotor axis 220a, and a second section with no core projection 244 formed therein. In the embodiment of the present disclosure, the entire gamut of the rotor core body 242 is formed as the first section along the direction of the rotor axis 220a, but it is not limited thereto and may be divided into the first and second sections, the supporting bridge 248 only formed in any of the sections of the rotor core body 242.

Adhesion holes 246, magnet receivers 250, combining space 252, open space 254, cavities 260a, and core connectors 270 are identical to those in the first embodiment.

A motor 300 in accordance with a third embodiment will now be described.

Features overlapping with the aforementioned embodiments will be omitted herein.

Figure 11:
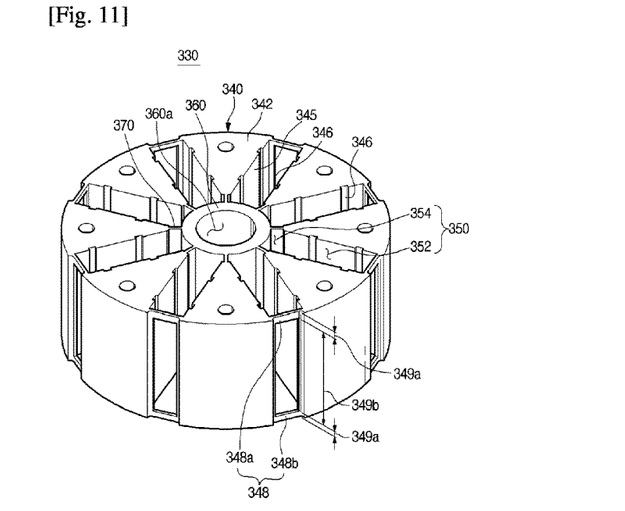
FIG. 11 is a perspective view of the rotor body, according to the third embodiment of the present disclosure.
Figure 12:
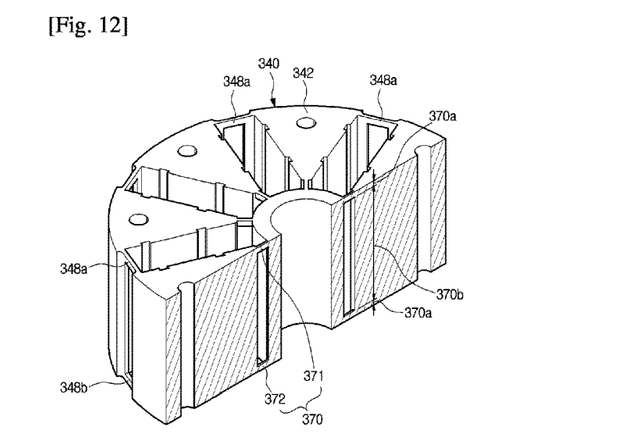
FIG. 12 is a cross-sectional perspective view of the rotor body, according to the third embodiment of the present disclosure.

FIG. 10 is a front view of a rotor body, according to a third embodiment of the present disclosure, FIG. 11 is a perspective view of the rotor body, according to the third embodiment of the present disclosure, and FIG. 12 is a cross-sectional perspective view of the rotor body, according to the third embodiment of the present disclosure.

In the embodiment, a rotor body 330 is different from what is shown in the first embodiment.

The rotor body 330 includes a plurality of rotor cores 340 radially arranged from the center of a rotor 320.

The rotor core 340 includes a rotor core body 342 and a supporting bridge 348.

The rotor core body 342 constitutes the body of the rotor core 340, and has magnet contact faces 345 on either sides in the circumferential direction of the rotor 320 to come into contact with a magnet 380. The rotor core body 342 may be formed to be thick in the circumferential direction as it is away from the center of the rotor 320. The rotor core body 342 may have a roughly triangular form.

There are no limitations on where to form the pair of magnet contact faces 345 on the rotor core body 342, but the pair of magnet contact faces 345 may be separated to form a certain angle between them. The magnet contact face 345 of one of the plurality of rotor cores 340 may be arranged in parallel with that of another neighboring rotor core 340.

The supporting bridge 348 supports the magnet 380 in the radial direction, preventing the magnet 380 from deviating from the rotor body 330.

The supporting bridge 348 may be formed to support the outer side of the magnet 380. Specifically, the supporting bridge 348 may be formed to support the second face 382 of the magnet 380.

The supporting bridge 348 is formed to connect one of the plurality of rotor cores 340 to another neighboring rotor core 340. While the first embodiment has the core projection 344 formed to support the second face 382 of the magnet 380 in the direction of the rotor axis 320a, the second embodiment has the supporting bridge 348 formed to support the second face 382 of the magnet 380 in the circumferential direction of the rotor 320.

The supporting bridge 348 may include a first section 349a in which the supporting bridge 348 is formed in the direction of the rotor axis 320a, and a second section 349b with no supporting bridge 348 formed therein.

In the embodiment of the present disclosure, the first sections 349a are placed at either ends of the rotor core 340 in the direction of the rotor axis 320a, and the second section 349b is placed between the first sections 349a.

The supporting bridge 348 is only formed in some portion of the rotor core 340 in the direction of the rotor axis 320a of the rotor core 340, i.e., in the height direction of the rotor core 340, thereby supporting the outer side of the magnet 380 and at the same time, minimizing leakage flux.

There may be a pair of the supporting bridges 348 formed on either sides of the rotor core 340 in the direction of the rotor axis 320a. Specifically, the supporting bridges 348 include a first supporting bridge 348a formed on the top of a pair of the neighboring rotor cores 340 and a second supporting bridge 348b formed on the bottom of the pair of the rotor cores 340, with respect to the height direction of the rotor 320. The first supporting bridge 348a and the second supporting bridge 348b are only examples, in which the supporting bridges 348 are formed to occupy some portion of the rotor core 340, without being limited thereto.

The rotor body 330 includes a ring combiner 360 and core connectors 370.

The core connector 370 is formed to connect the ring combiner 360 with the plurality of rotor cores 340. The core connector 370 may radially extend from the ring combiner 360 and connect the plurality of rotor cores 340 and the ring combiner 360 to integrally form them. The core connector 370 is formed to be thinner than the rotor cores 340 so as to reduce leakage flux.

The core connector 370 may be formed to have the same level as the core body in the height direction of the core as in the first embodiment, and may be formed to occupy a portion as in the present embodiment.

Specifically, the core connector 370 is formed to connect at least a portion of the ring combiner 360 in the direction of the rotor axis 320a to at least a portion of the rotor core 340 in the direction of the rotor axis 320a.

If the core connector 370 supports the entire gamut of the rotor core 340 in the direction of the rotor axis 320a against the ring combiner 360, the rotor core 340 may be more reliably supported. As in the present embodiment, the core connector 370 only formed to occupy a portion causes reduction of leakage flux from the rotor 320.

The core connector 370 may include a first connection section 370a in which the core connector 370 is formed in the direction of the rotor axis 320a, and a second connection section 370b with no core connector 370 formed therein.

In the embodiment of the present disclosure, the first connection sections 370a are placed at either ends of the ring combiner 360 and rotor core 360 in the direction of the rotor axis 320a, and the second connection section 349b is placed between the first sections 370a.

The core connector 370 is only formed to occupy a portion of the rotor core 340 and ring combiner 360 in the direction of the rotor axis 320a, i.e., in the height direction of the rotor core 360 and the ring combiner 360, thereby supporting rotation of the rotor core 340 and at the same time, minimizing leakage flux.

The core connector 370 includes a first core connector 370 connecting the top of the rotor core 340 to the top of the ring combiner 360 and a second core connector 370 connecting the bottom of the rotor core 340 to the bottom of the ring combiner 360, with respect to the height direction of the rotor 320. The first and second core connectors 370 are only examples, in which the core connector 370 is formed to occupy a portion of the rotor core 340, without being limited thereto.

Adhesion holes 346, magnet receivers 350, combining space 352, open space 354, and cavities 360a are identical to those in the first embodiment.

A motor 400 in accordance with a fourth embodiment will now be described.

Features overlapping with the aforementioned embodiments will be omitted herein.

Figure 13:
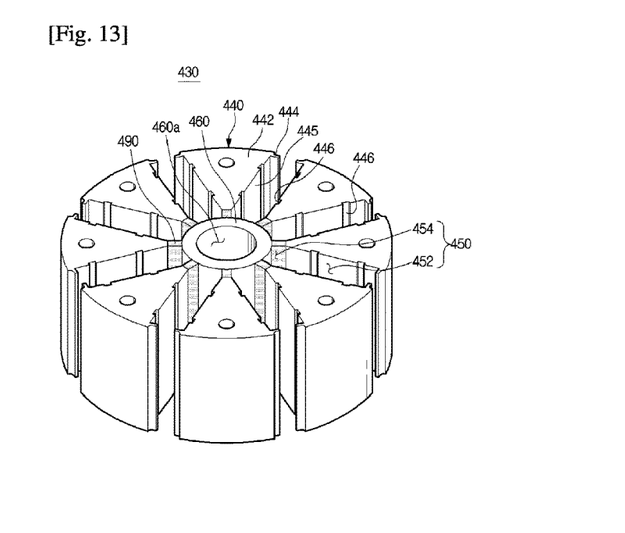
FIG. 13 is a perspective view of a rotor body, according to a fourth embodiment of the present disclosure.
Figure 14:
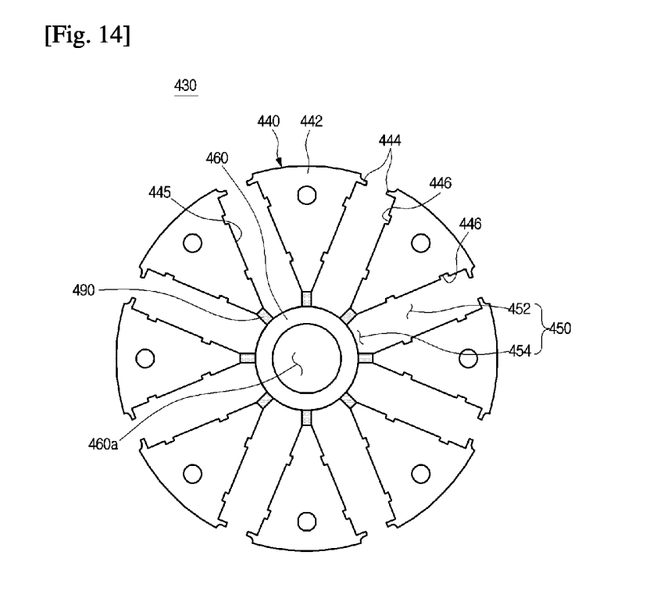
FIG. 14 is a front view of the rotor body, according to the fourth embodiment of the present disclosure.

FIG. 13 is a perspective view of a rotor body, according to a fourth embodiment of the present disclosure, and FIG. 14 is a front view of the rotor body, according to the fourth embodiment of the present disclosure.

In the embodiment, a rotor body 430 is different from what is shown in the first embodiment.

The rotor body 430 includes a plurality of rotor cores 440 radially arranged from the center of a rotor 420, and a ring combiner 460.

The plurality of rotor cores 440 and the ring combiner 360 may be arranged to be separated from each other. The plurality of rotor cores 440 may be connected by the supporting bridges 248, 348 as in the second and third embodiments, but in this embodiment, the plurality of rotor cores 440 are formed to be separated from one another.

This configuration is to minimize leakage flux between the plurality of rotor cores 440 and the ring combiner 360.

The rotor 420 may include insulation connectors 490 arranged to mechanically connect the plurality of rotor cores 440 of the rotor body 430 to the ring combiner 460. The insulation connector 490 may include a plastic material. The insulation connector 490 may be injection-molded along with rotor body 430. Specifically, the insulation connector 490 may be formed by insert-injection along with the rotor core 440 and the ring combiner 460.

The insulation connector 490 may minimize leakage flux by blocking a passage, through which leakage flux may circulate inside the rotor 420. Specifically, it maximizes production of an active flux among fluxes generated by the rotor 420 to interact with the stator 410 while minimizing leakage flux that circulates inside the rotor 420.

Adhesion holes 446, magnet receivers 450, combining space 452, open space 454, and cavities 460a are identical to those in the first embodiment.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

The aforementioned embodiments may not be independent from one another, in which case a configuration in an embodiment may be applied in another embodiment.

The invention claimed is:

1. A motor comprising:
a stator having a plurality of stator cores arranged in a circumferential direction and a plurality of coils wound around the plurality of stator cores; and
a rotor arranged to be able to rotate inside or outside of the stator,
wherein the rotor comprises
a plurality of rotor cores arranged in a circumferential direction of the rotor;
a ring combiner with a cavity formed in a middle portion of the ring combiner surrounding a center of rotation of the rotor; and
a plurality of magnets arranged between the plurality of rotor cores,
wherein an open space is formed directly between an entire face of a first face of one of the plurality of magnets and the ring combiner.

2. The motor of claim 1, wherein the rotor comprises
a plurality of magnet receivers formed between the plurality of rotor cores for receiving the plurality of magnets,
wherein the plurality of magnet receivers comprise
a combining space in which the plurality of magnets are arranged; and
the open space being formed between the combining space and the ring combiner.

3. The motor of claim 1, wherein one of the plurality of magnets is configured to protrude more than the plurality of rotor cores in a direction of a rotor axis of the rotor.

4. The motor of claim 1, wherein the one of the plurality of magnets comprises
the first face, a second face, an opposite face of the first face, placed farther away from the ring combiner than the first face is, and a third face placed between the first and second faces,
wherein the second and third faces are configured to be supported by one of the plurality of rotor cores.

5. The motor of claim 4,
wherein the one of the plurality of magnets is configured to be fixed in the one of the plurality of rotor cores by having the second and third faces supported by the one of the plurality of rotor cores.

6. The motor of claim 4, wherein the one of the plurality of rotor cores comprises
a rotor core body having a magnet contact face to come into contact with the third face; and
a core projection formed to protrude from the rotor core body to the circumferential direction in order to support at least a part of the second face.

7. The motor of claim 6, wherein the rotor core body comprises
the magnet contact face tightly contacting the third face of one of the plurality of magnets; and
an adhesive hole concavely formed from the magnet contact face in order for an adhesive to be injected thereto.

8. The motor of claim 7,
wherein the rotor core body is configured to become thicker in the circumferential direction as it extends away from the ring combiner, and
wherein the magnet contact face is configured to be in parallel with a magnet contact face of a neighboring rotor core.

9. The motor of claim 4, wherein the rotor comprises
a supporting bridge formed to extend from one of the plurality of rotor cores to another rotor core of the plurality of rotor cores.

10. The motor of claim 9, wherein the one of the plurality of rotor cores comprises
a magnet contact face formed to face a circumferential direction of the rotor, and
wherein one of the plurality of magnets is configured to have the second face supported by the supporting bridge, and have the third face come into contact with the magnet contact face.

11. The motor of claim 9,
wherein the supporting bridge is configured to support at least a part of the second face.

12. The motor of claim 9,
wherein the supporting bridge comprises a pair of supporting bridges arranged in the one of the plurality of rotor cores at one end and the other end in a direction of the rotor axis.

13. The motor of claim 1, wherein the rotor comprises
a core connector configured to support one of the plurality of rotor cores and extend from the one of the plurality of rotor cores to the circumferential direction of the rotor, and
wherein the core connector is configured to be thinner than a neighboring rotor core.

14. The motor of claim 13, wherein the rotor comprises
a rotor shaft formed in the direction of a rotor axis; wherein
the ring combiner is combined with the rotor shaft to enclose the rotor shaft, and
the core connector is configured to connect at least a part of the ring combiner in a direction of the rotor axis to at least a part of the one of the plurality of rotor cores in the direction of the rotor axis.

15. The motor of claim 13, wherein the core connector comprises
a first core connector configured to connect a top of the one of the plurality of rotor cores to a top of the ring combiner, with respect to the height direction of the rotor; and
a second core connector configured to connect a bottom of the one of the plurality of rotor cores to a bottom of the ring combiner.

16. The motor of claim 1,
wherein the rotor comprises a rotor shaft formed in a direction of a rotor axis; and
the ring combiner combined with the rotor shaft to enclose the rotor shaft, and
wherein one of the plurality of rotor cores is configured to separate from the ring combiner.

17. The motor of claim 16,
wherein the rotor comprises insulation connectors configured to connect the ring combiner to the plurality of rotor cores and include a plastic material.

18. The motor of claim 17,
wherein the insulation connectors are injection-molded with the plurality of rotor cores and the ring combiner.

* * * * *